United States Patent
Fukuoka et al.

(10) Patent No.: US 6,294,033 B1
(45) Date of Patent: Sep. 25, 2001

(54) LAMINATION APPARATUS AND SHEET ROLL FOR USE IN LAMINATION APPARATUS

(75) Inventors: Mutsuo Fukuoka, Aichi-ken; Hirokazu Iwata, Iwata, both of (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/346,294

(22) Filed: Jul. 2, 1999

(30) Foreign Application Priority Data

Jul. 27, 1998 (JP) .................................................. 10-210490

(51) Int. Cl.$^7$ ...................................................... B32B 31/04

(52) U.S. Cl. ............................ 156/64; 156/378; 156/555; 156/582; 492/47

(58) Field of Search .............................. 156/64, 350, 378, 156/555, 582; 100/43; 492/47

(56) References Cited

U.S. PATENT DOCUMENTS

| | | | | |
|---|---|---|---|---|
| 4,149,925 | * | 4/1979 | Mintz | 156/361 |
| 5,098,507 | * | 3/1992 | Mao | 156/351 |
| 5,296,076 | * | 3/1994 | Morita | 156/361 |
| 5,368,677 | * | 11/1994 | Ueda et al. | 156/362 |

* cited by examiner

Primary Examiner—James Sells
(74) Attorney, Agent, or Firm—Oliff & Berridge, PLC (57) ABSTRACT

The invention provides a lamination apparatus including using a sheet roll with an encoder plate secured to the end face of an adhesive sheet roll, and a slit pattern on the encoder plate being detected by a photointerruptor. In addition, a duty ratio is calculated on the basis of rectangular pulse signals output from the photointerruptor, thereby identifying the type of the adhesive sheet roll. Further, the period of the rectangular pulse signals output from the photointerruptor is compared with a predetermined value, such that the trailing edge of the adhesive sheet of the adhesive sheet roll is detected at the time point when the period is smaller than the predetermined value.

23 Claims, 11 Drawing Sheets

| T1/T2 | TYPE OF ADHESIVE SHEET ROLL |
|---|---|
| A | A SHEET |
| B | B SHEET |
| C | C SHEET |
| D | D SHEET |

LAMINATION APPARATUS AND SHEET ROLL FOR USE IN LAMINATION APPARATUS

BACKGROUND OF THE INVENTION

1. Field of Invention

The invention relates to a lamination apparatus for laminating an original medium such as a sheet or the like with a sheet(s) such as synthetic resin film or the like, and a sheet roll loaded in the lamination apparatus.

2. Description of Related Art

The following methods have been hitherto proposed as a method of detecting the type and the trailing edge of a laminated medium, a print tape or the like which is used for a tape printing device having a laminating mechanism, etc.

For example, in the case of a tape printing device for printing characters or the like on an elongated tape and then laminating a transparent sheet on the print face of the tape to form a character-printed tape, there are prepared various tape cassettes in which tapes having various widths are respectively mounted, and a desired tape cassette is selected from these tape cassettes in accordance with its using purpose to form a character-printed tape.

According to the tape printing device, the detection of the presence or absence of a tape cassette and the detection of the type of a tape cassette are performed as follows. That is, a plurality of micro-switches are arranged in a predetermined detection pattern in a cassette mounting portion of the tape printing device, and a switch operating unit for selectively switching on/off each micro-switch is provided at the tape cassette side. When a tape cassette is mounted in the cassette mount portion, the presence or absence of the tape cassette and the type of the tape cassette are detected on the basis of the signal pattern (on/off pattern) of signals output from the respective micro-switches.

The detection of the trailing edge of the tape mounted in the tape cassette is performed as follows. For example, an end mark is printed in the neighborhood of the trailing edge of the tape, and an end sensor is provided at the cassette mount portion. The end mark of the tape is detected through the end sensor to detect the trailing edge of the tape.

However, in the case of the tape printing device as described above, a plurality of sensors such as detection switches or the like are needed to detect the presence or absence of a tape cassette and the type of the tape cassette. An optical sensor is also needed to detect the trailing edge of the tape.

As described above, in order to perform the detection of various targets (i.e., the presence or absence of a tape cassette, the type of a tape cassette, etc.), the conventional apparatus needs a plurality of sensors whose number corresponds to the number of targets to be detected. Accordingly, the structure of the conventional apparatus is complicated, and the total cost of the apparatus is increased.

SUMMARY OF THE INVENTION

Therefore, one aspect of the invention is to provide a lamination apparatus and a sheet roll for use in the lamination apparatus, which enable detection of various kinds of characteristics of the sheet roll (the presence or absence of the sheet roll, the type of the sheet roll, the trailing edge portion of the sheet) with only one sensor on the basis of various information obtained by securing an encoder member having a slit pattern to the end face of the sheet roll and detecting the slit pattern at the rotation time of the sheet roll, thereby simplifying the structure of the apparatus and reducing the cost of the apparatus.

In order to attain the above object, according to a first aspect of the invention, a lamination apparatus in which both surfaces of an original medium is laminated by sheets to form a laminated medium, may include: a sheet roll which is obtained by rolling an elongated-band type sheet and provided at one end face thereof with an encoder member having a predetermined slit pattern formed thereon; a driver for rotating the sheet roll; a detector for detecting the slit pattern of the encoder member to output a detection signal while the sheet roll is rotated by the driver; and a controller for identifying two or more characteristics of the sheet roll on the basis of the detection signal output from the detector.

In the above lamination apparatus, when the laminated medium of the original medium is formed, the sheet roll is rotated by the driver, and the slit pattern of the encoder member secured to the end face of the sheet roll is detected by the detector. The two or more characteristics of the sheet roll may be determined on the basis of the detection signal output from the detector by the controller.

Various characteristics are contained as the characteristics of the sheet roll. According to the lamination apparatus of the first aspect of the invention, the two or more characteristics of the sheet roll may be identified through the detector and the controller on the basis of the slit pattern of the encoder member. Therefore, the apparatus can be simplified, and the cost can be reduced.

According to a second aspect of the invention, in the lamination apparatus of the first aspect of the invention, the controller may identify the type of the sheet roll on the basis of the detection signal.

According to the lamination apparatus of the second aspect of the invention, if the slit pattern of the encoder member secured to the end face of the sheet roll is varied in accordance with the type of the sheet roll, the detection signal is varied in accordance with the slit pattern. Accordingly, the type of the sheet roll may be identified.

According to a third aspect of the invention, in the lamination apparatus of the first or second aspect of the invention, the controller identify the trailing edge of the rolled sheet on the basis of the detection signal.

According to the lamination apparatus of the third aspect of the invention, as the use amount of the sheet roll is increased, the inner diameter of the sheet roll is reduced. Therefore, as the use amount of the sheet roll is increased, the rotational speed of the sheet roll is increased during the laminating process because the sheet feeding speed is constant. Accordingly, the rotational speed of the encoder member is increased, and the detection signal output from the detector may be varied. Therefore, the trailing edge of the sheet may be detected on the basis of the variation of the detection signal by the controller.

According to a fourth aspect of the invention, in the lamination apparatus of each of the first to third aspects of the invention, the controller may identify the presence or absence of the sheet roll on the basis of the detection signal.

According to the lamination apparatus of the fourth aspect of the invention, if the slit pattern of the encoder member secured to the end face of the sheet roll is detected, the presence or absence of the sheet roll may be detected on the basis of the detection signal.

According to a fifth aspect of the invention, a sheet roll for use in a lamination apparatus in which both surfaces of an original medium is laminated by a sheet to form a laminated medium, may include an elongated band type sheet rolled in a roll shape and an encoder member having a predetermined slit pattern formed therein and secured to the end face of the sheet roll.

According to the sheet roll of the fifth aspect of the invention, when the sheet roll is rotated during the process of forming the laminated medium from the original medium in the lamination apparatus, the encoder member secured to the end face of the sheet roll is rotated. Therefore, the slit pattern may be detected in association with the rotation of the encoder member, whereby various characteristics on the sheet roll may be identified.

DETAILED DESCRIPTION OF PREFERRED EMBODIMENTS

Preferred embodiments according to the present invention will be described hereunder with reference to the accompanying drawings. First, the main part of the lamination apparatus and a sheet cassette will be described with reference to FIGS. 1 to 6.

Figure 1:
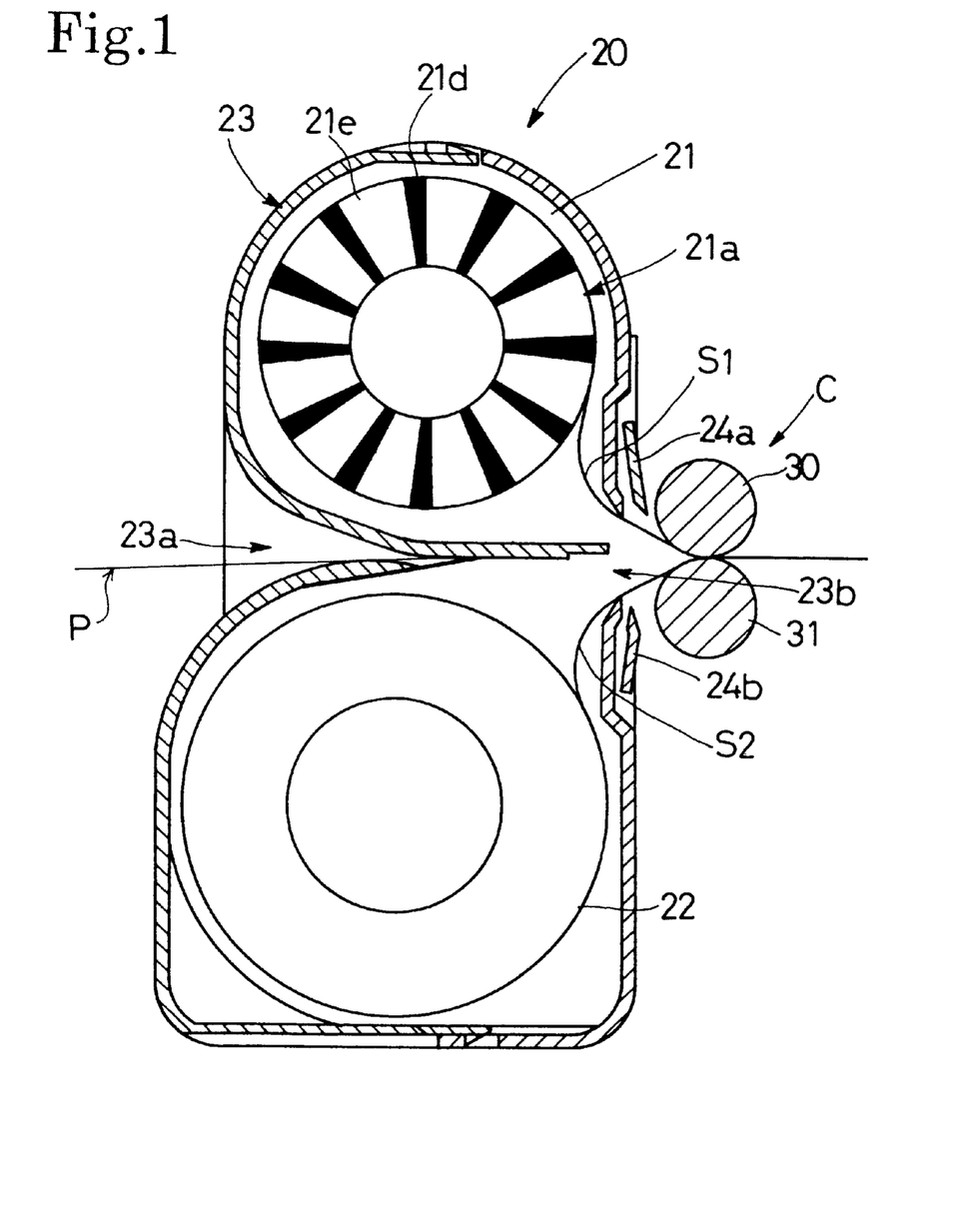
FIG. 1 is a cross-sectional view of a sheet cassette mounted in a lamination apparatus.

As shown in FIG. 1, a sheet cassette 20 comprises an adhesive sheet roll 21 obtained by rolling an elongated band type adhesive sheet S1 with the adhesive face thereof facing inwardly, a double-sided adhesive sheet roll obtained by rolling an elongated band type double-sided adhesive sheet S2 into a roll sheet, and a housing 23 in which the adhesive sheet roll 21 and the double-sided adhesive sheet roll 22 are rotatably supported. The adhesive sheet roll 21 is supported in the housing so that the adhesive face of the adhesive sheet S1 drawn out from the adhesive sheet roll 21 confronts the double-sided adhesive sheet S2 drawn from the double-sided adhesive sheet roll 22. At this time, both the sheets S1 and S2 are drawn out from the sheet rolls 21, 22 in the vicinity of a feed-out port 23b so that the sheet rolls 21 and 22 are rotated in the opposite directions.

A peel-off sheet is provided to one surface (the lower (outer) surface of the double-sided adhesive sheet S2) of the double-sided adhesive sheet S2 at the opposite side to the laminate surface (the other surface) of the double-sided adhesive sheet S2 which is laminated on the original medium P, and the double-sided adhesive sheet S2 is rolled into a double-sided adhesive sheet roll 22 with the peel-off sheet being provided to the surface of the double-sided adhesive sheet S2.

As shown in FIG. 1, the housing 23 is provided with a medium insertion port 23a through which the original medium P is fed to the gap between the adhesive sheet roll 21 and the double-sided adhesive sheet roll 22, feed-out port 23b through which the original medium P fed from the medium insertion port 23a is fed out to a lamination processor C together with the adhesive sheet S1 and the double-sided adhesive sheet S2 drawn from the adhesive sheet roll 21 and the double-sided adhesive sheet roll 22 respectively, and a pair of shutters 24a and 24b are provided as a regulating member for opening/closing the feed-out port 23b in the neighborhood of the feed-out port 23b.

Further, a pinch roller comprising a pair of upper roller 30 and lower roller 31 which corresponds to the lamination processor C, is disposed at the downstream side of the feed-out port 23b of the sheet cassette 20. The upper roller 30 is upwardly retractably supported by a release mechanism (not shown) so that the leading edge portions of the adhesive sheet S1 and the double-side adhesive sheet S2 which are obliquely downwardly projected from the sheet cassette 20 while they are adhesively attached to each other when the sheet cassette 20 is loaded in the lamination apparatus are easily inserted between the upper roller 30 and the lower roller 31. The upper roller 30 is rotated by a driving motor 39 (see FIG. 7).

Figure 2:
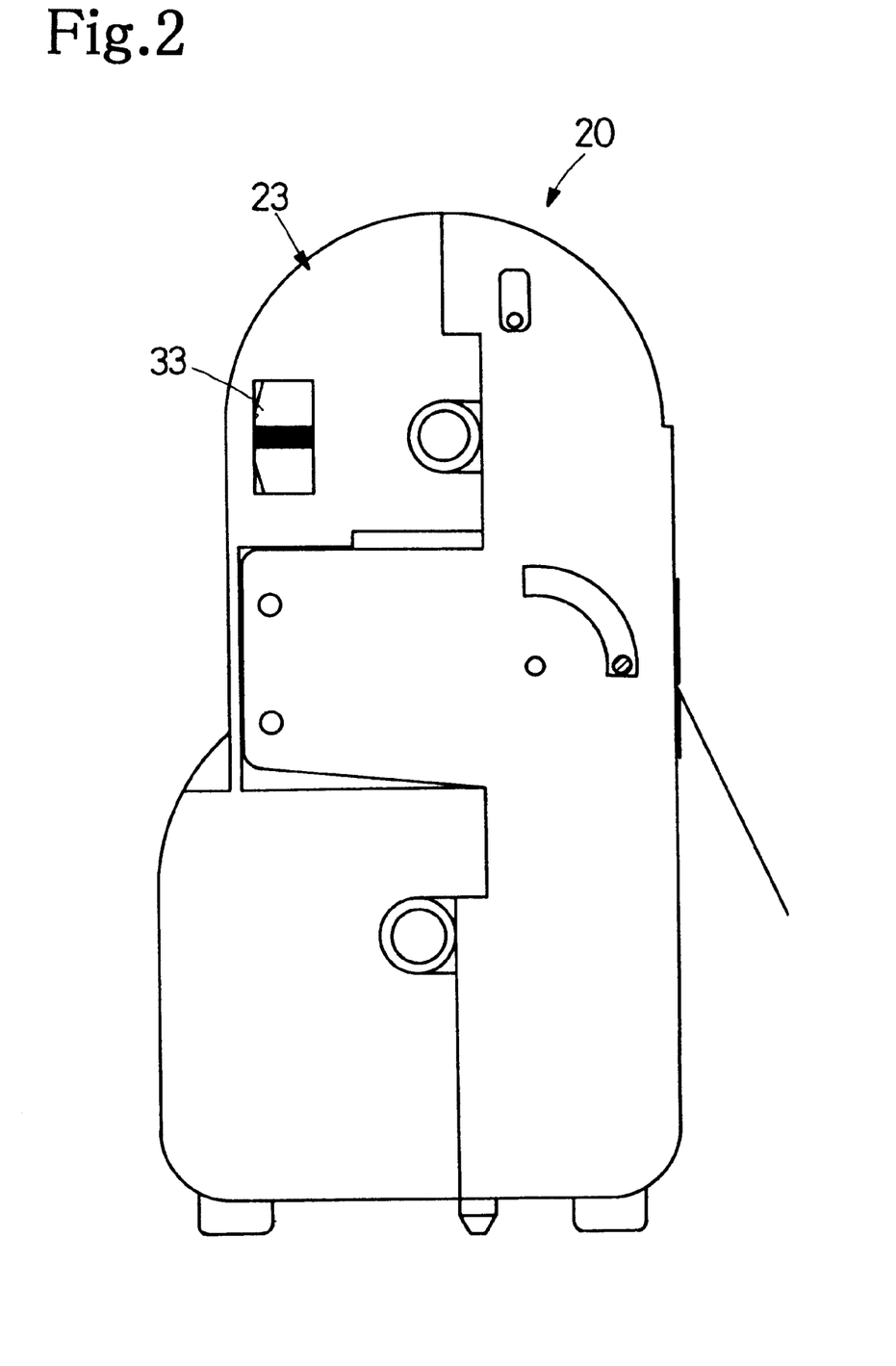
FIG. 2 is a side view of the sheet cassette mounted in the lamination apparatus.
Figure 3:
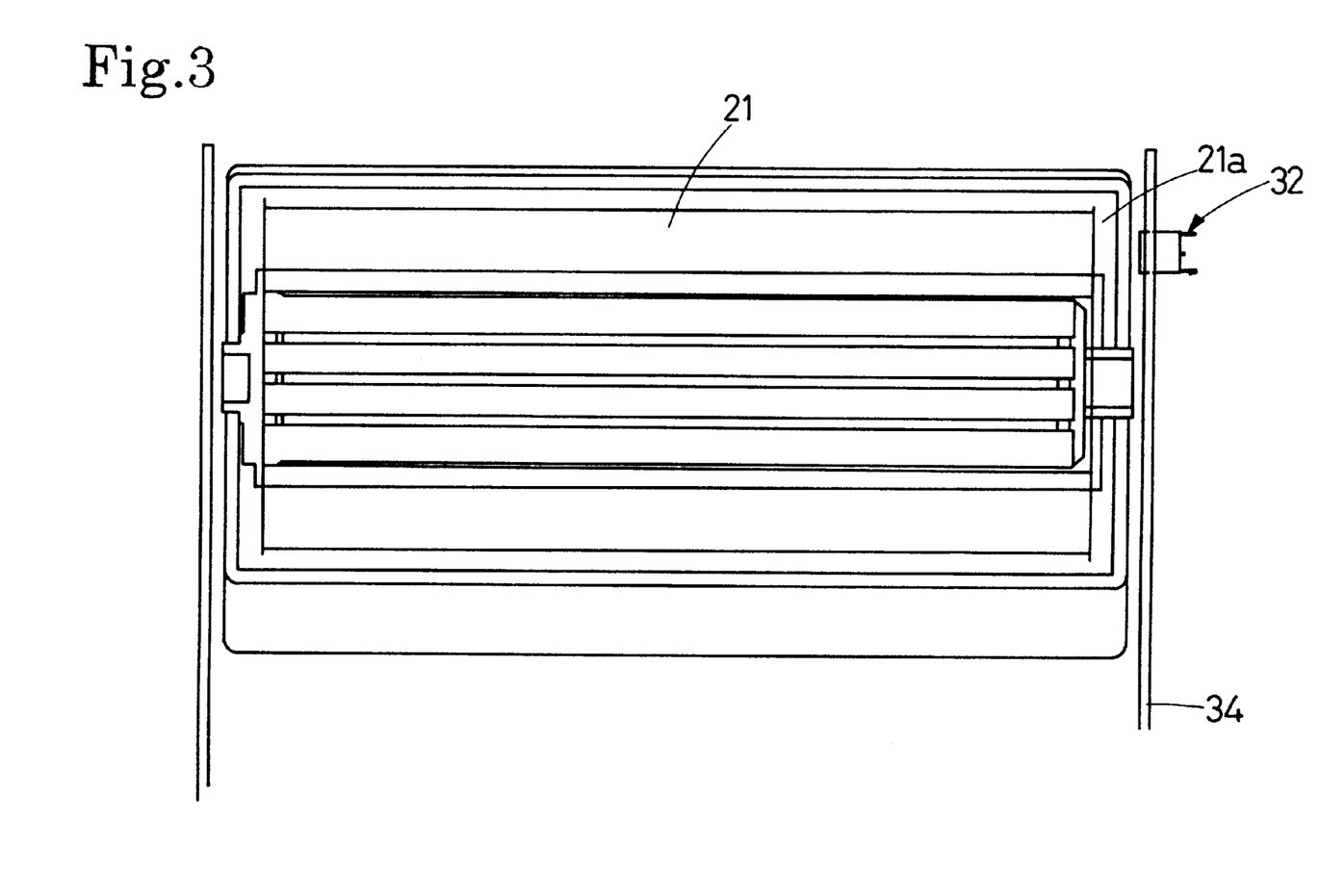
FIG. 3 is a plane cross-sectional view of the lamination apparatus.

An encoder plate 21a is secured to at least one end face of the adhesive sheet roll 21. A predetermined slit pattern is formed in the encoder plate 21a, and a part of the slit pattern of the encoder plate 21a is exposed to the outside through a window 33 formed in the sheet cassette 30 as shown in FIGS. 2 and 3. A frame 34 is provided to the lamination apparatus so as to be adjacent to the window 33, and a photointerruptor 32 is provided to the frame 34 so as to confront the window 33. The slit pattern of the encoder plate 21a is detected through the window 33 by the photointerruptor 32.

The slit pattern of the encoder plate 21a is composed of a black pattern 21d and a white pattern 21e. In the slit pattern of the encoder plate 21a, the width of the black pattern 21d and the width of the white pattern 21e are varied in accordance with the type of the adhesive sheet roll 21 as shown in FIG. 1 and FIGS. 4 to 6. Light is emitted from the photointerruptor 32 to the encoder plate 21a, and the photointerruptor 32 detects the black pattern 21 d or the white pattern 21e on the basis of the light amount of light reflected from the encoder plate 21a.

Figure 4:
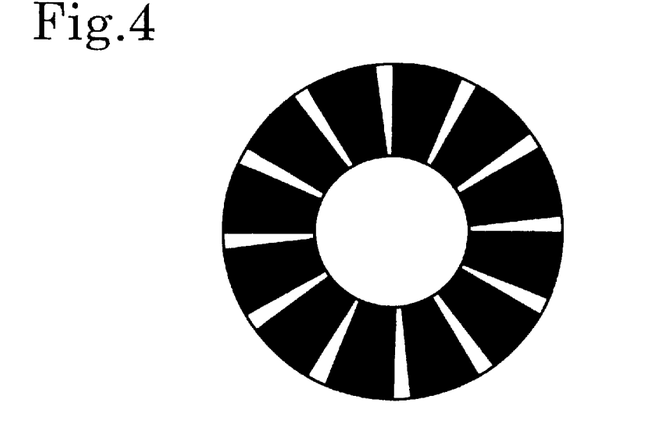
FIG. 4 is a plan view showing a slit pattern on an encoder plate in a first embodiment of the present invention.

In the case of the encoder plate of FIG. 1, the white pattern 21e and the black pattern 21d of the slit pattern on the encoder plate 21a are designed so that (the width of the white pattern 21e) : (the width of the black pattern 21d)=3:1. Conversely, in the case of the encoder plate of FIG. 4, they are designed so that (the width of the white pattern 21e) :

(the width of the black pattern 21d)=1:3. Further, in the case of the encoder plate of FIG. 5, the white and black patterns are designed so that (the width of the white pattern 21e) : (the width of the black pattern 21d)=1.5:1. In the case of the encoder plate of FIG. 6, they are designed to have the inverse width relationship between the white and black patterns to that of FIG. 5.

Figure 7:
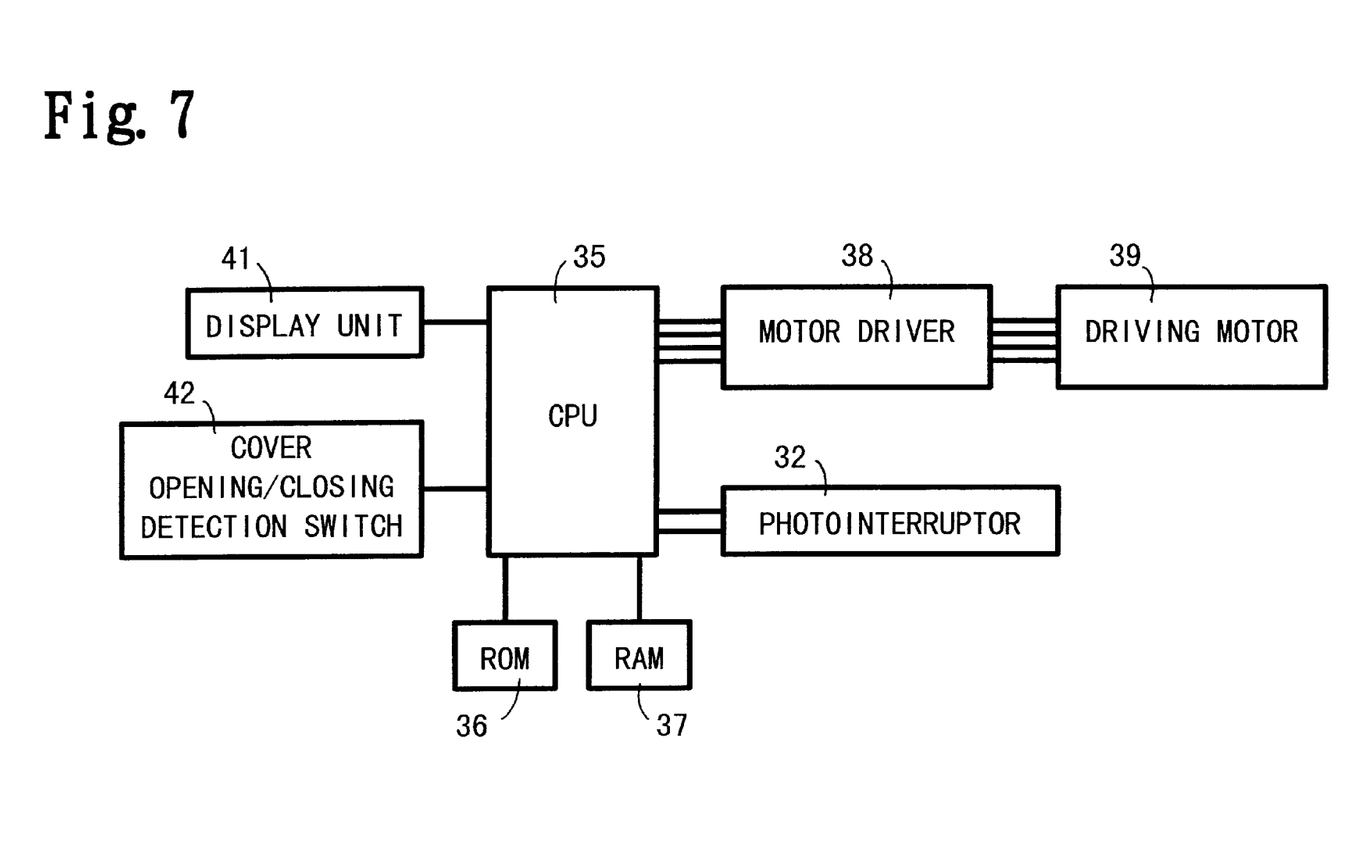
FIG. 7 is a block diagram showing a controller of the lamination apparatus.

Next, the controller of the lamination apparatus will be described with reference to FIG. 7 (control block diagram).

The controller has a CPU 35 as a core. CPU 35 is provided with ROM 36 and RAM 37. CPU 35 is connected to the photointerruptor 32, a motor driver 38, a cover opening/closing detection switch 42 and a display unit 41, and the motor driver 38 is connected to a driving motor 39.

When the adhesive sheet S1 and the double-sided adhesive sheet S2 are laminated on both the surfaces of the original medium P to form a laminated medium, the adhesive sheet roll 21, the double-sided adhesive sheet roll 22 and the respective rollers 30, 31 are rotated through the motor driver 38 and the driving motor 39 under the control of the CPU 35 of the controller, whereby the encoder plate 21a of the adhesive sheet roll 21 is rotated and the slit patter is detected through the photointerruptor 32 on the basis of the rotation of the encoder plate 21a. Here, a train of rectangular pulse signals each of which corresponds to the width of each of the white and black patterns of the slit pattern is obtained as a detection signal of the photointerruptor 32, as described below. The detection signal is stored in the RAM 37. As described below, the type of the adhesive sheet roll 21, the trailing edge of the adhesive sheet S1 and the presence or absence of the adhesive sheet roll 21 are detected on the basis of the detection signal according to the identification processing program stored in the ROM 36.

Figure 8:
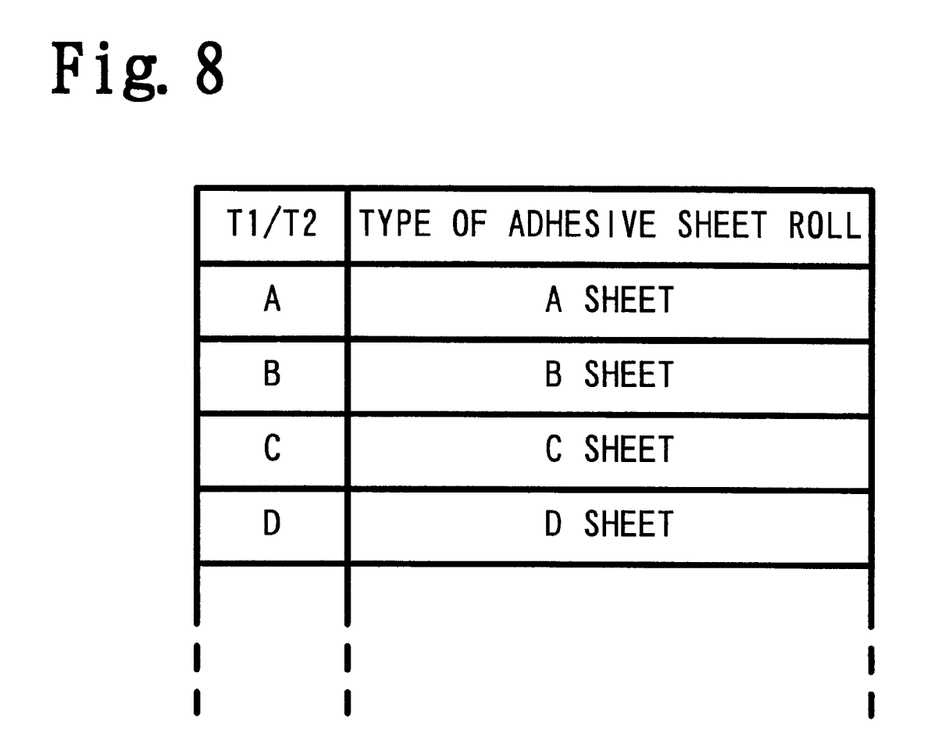
FIG. 8 is a table showing the corresponding relationship between the duty ratio and the type of adhesive sheet roll in the first embodiment.

In addition to the identification processing program, a table representing the corresponding relationship between the duty ratio T1/T2 (see FIG. 9) and the type of the adhesive sheet roll 21 is stored in the ROM 36. FIG. 8 shows the table showing the corresponding relationship between the duty ratio T1/T2 and the type of the adhesive sheet roll 21 stored in the ROM 36.

The content of the table shown in FIG. 8 is set as follows: when the duty ratio T1/T2 is equal to A, the adhesive sheet S1 corresponds to A sheet; when the duty ratio T1/T2 is equal to B, the adhesive sheet S1 corresponds to B sheet; when the duty ratio T1/T2 is equal to C, the adhesive sheet S1 corresponds to C sheet; and when the duty ratio T1/T2 is equal to D, the adhesive sheet S1 corresponds to D sheet.

Next, the control processing of the lamination apparatus will be described with reference to FIGS. 8 to 10.

Figure 9:
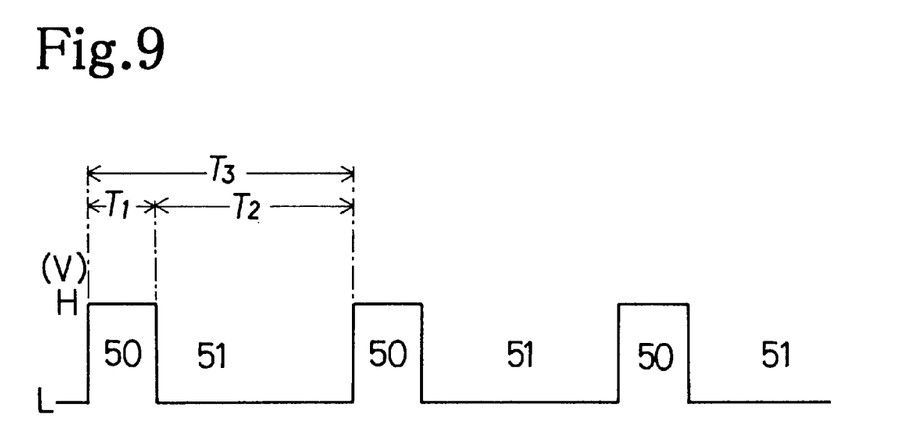
FIG. 9 is a signal waveform diagram showing rectangular pulse signals detected from the slit pattern on the encoder plate of FIG. 1.
Figure 10:
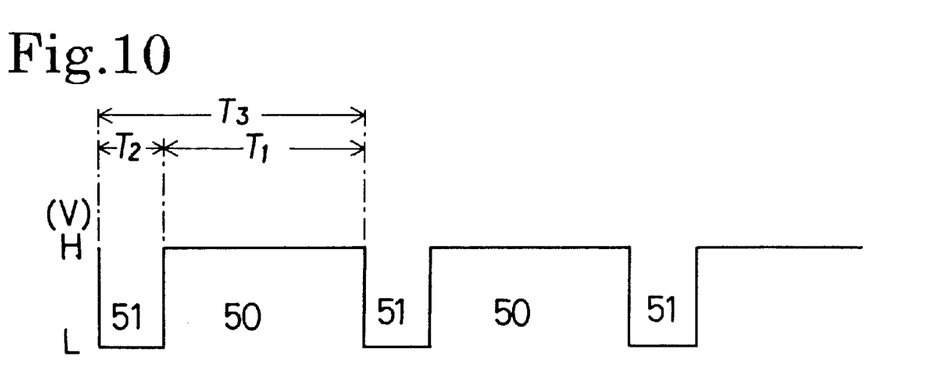
FIG. 10 is a signal waveform diagram showing rectangular pulse signals detected from the slit pattern on the encoder plate of FIG. 4.
Figure 11A:
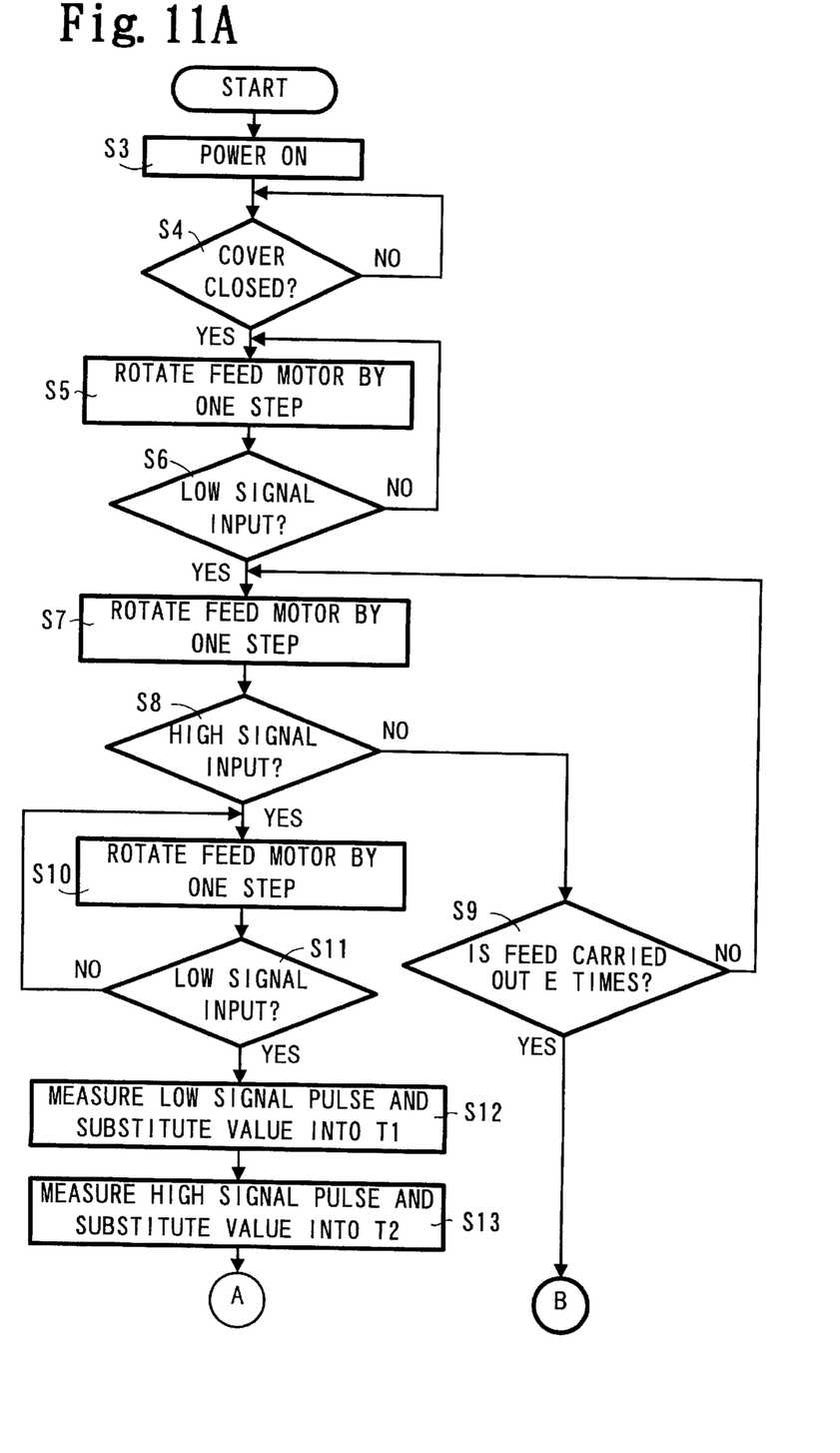
FIGS. 11A and 11B is a flowchart showing identification processing of the lamination apparatus according to the first embodiment.
Figure 11B:
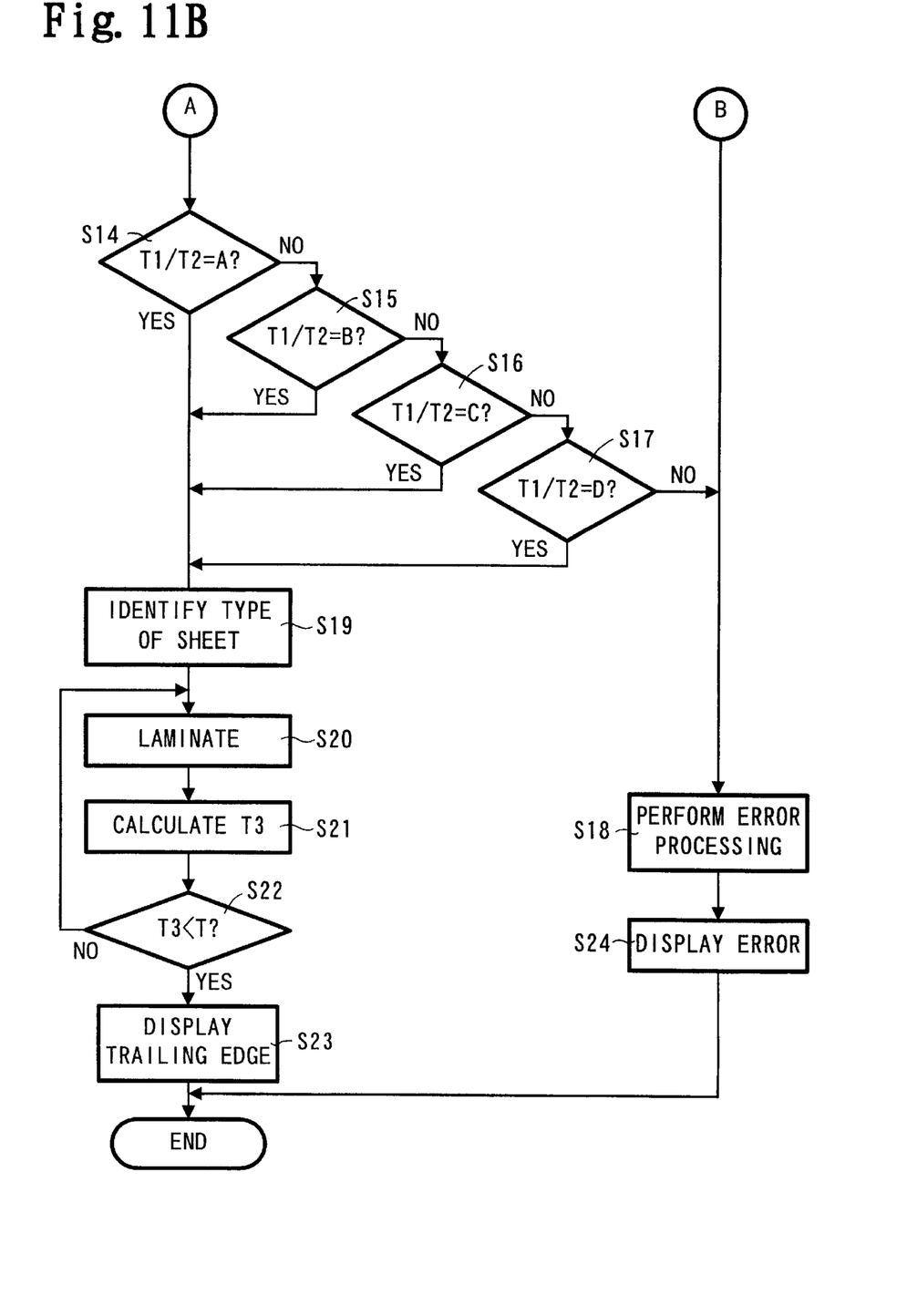

FIG. 9 is a signal waveform diagram showing rectangular pulses of detection signals obtained by detecting the slit pattern of the encoder plate 21a of FIG. 1 through the photointerruptor 32, FIG. 10 is a signal waveform diagram showing rectangular pulses of detection signals obtained by detecting the slit pattern of the encoder plate 21a of FIG. 4 through the photointerruptor 32, and FIG. 11 is a flowchart showing the identification processing of the lamination apparatus. In this case, the encoder plate 21a shown in FIG. 1 is assumed to be secured to the end face of the sheet roll 21.

When the power source is switched on (S3), it is determined in step S4 whether the cover of the main body is closed. If it is determined that the cover of the main body is closed (S4:YES), the processing goes to a next step S5. If the cover is not closed (S4:NO), the processing returns to S4 to repeat the above determination processing until the cover is closed.

In step S5, a command for rotating the driving motor 39 by one step is output to the motor driver 38, and then the processing goes to S6. In S6, the HIGH/LOW state is detected in the photointerruptor 32, thereby determining whether a LOW signal 51 is input. If it is determined that a LOW signal 51 is input (S6:YES), the processing goes to next step S7. If it is determined that a LOW signal has not been input from the photointerruptor 32 (S6:NO), the processing returns to S5 to repeat the operation and determination then starts in steps S5 and S6 until the input of a LOW signal 51 is determined.

In S7, the driving motor 39 is rotated by one step as in the case of the step S5, and then the processing goes to S8. In S8, the LOW/HIGH state is detected in the photointerruptor 32, thereby determining whether the HIGH signal 50 is input. If it is determined that the HIGH signal 50 is input (S8:YES), the processing goes to S10. If it is determined that a HIGH signal 50 has not been input (S8: NO), it is determined in S9 whether FEED is carried out at a predetermined number of times (E times).

If FEED is not carried out at the predetermined number of times (S9:NO), the processing returns to S7 to repeat the operation and the determination steps in S7 to S9 until it is determined that the HIGH signal 50 is input (S8:YES) or it is determined that FEED is carried out at the predetermined number of times (S9:YES).

When no HIGH signal 50 is input even when FEED is carried out at the predetermined number of times (S9:YES), it is determined that the adhesive sheet roll 21 is not set, and the processing goes to S18 to perform error processing. After the error processing is carried out, the processing goes to S24 to display an error on the display unit 41 (S24), thereby completing the processing. If it is determined that the HIGH signal 50 is input upon of FEED operations whose number is less than the predetermined number of times (S8:YES), the processing goes to S10.

As in the case of S5, in S10 the driving motor 39 is rotated by one step, and then the processing goes to S11. In next S11, the HIGH/LOW state is detected in the photointerruptor 32, thereby determining whether the LOW signal 51 is input. If it is determined that the LOW signal 51 is input (S11:YES), the processing goes to next S12. If it is determined that LOW signal 51 has not been input from the photointerruptor 32 (S11:NO), the processing returns to S10 to repeat the operation and the determination of S10, S11 until it is determined that a LOW signal 51 is input.

In subsequent step S12, the pulse width T1 of the HIGH signal 50 obtained by each processing is measured, and the T1 value thus measured is substituted into the operation expression T1/T2.

Through the steps S14 to S17, the duty ratio T1/T2 is calculated on the basis of the operation expression from the pulse width T1 of the HIGH signal 50 and the pulse width T2 of the LOW signal 51 thus obtained, and the type of the sheet roll 21 is searched for the basis of the calculation value from the table stored in the ROM (see FIG. 8).

When the adhesive sheet roll 21 corresponding to the duty ratio T/T2 is identified (any one of S14 to S17: YES), the processing goes to S19 to display the type of the adhesive sheet roll 21 on the display unit 41. Specifically, when the duty ratio T1/T2 is equal to the value of A (S15: YES), the adhesive sheet S1 of the sheet roll 21 is identified as A sheet; when the duty ratio T1/T2 is equal to the value of B (S15: YES), the adhesive sheet of the adhesive sheet roll 21 is identified as B sheet; when the duty ratio T1/T2 is equal to the value of C (S16: YES), the adhesive sheet of the adhesive sheet roll 21 is identified as C sheet; and when the duty ratio T1/T2 is equal to the value of D (S17: YES), the adhesive sheet of the adhesive sheet roll 21 is identified as D sheet. When the adhesive sheet roll 21 corresponding to the duty ratio T1/T2 is not identified (S14 to S17: No), the error processing is carried out in S18, and this fact is displayed on the display unit 41, thereby completing the processing.

After the identification of the type of the adhesive sheet S1 is completed in S19, the laminating operation is started in S20, the period T3 (T1+T2) is measured from the detection signal of the photointerruptor 32, and then the processing goes to S22. If it is determined in S22 that the period T3 is larger than a predetermined value T stored in ROM 36 (S22: NO), the processing returns to S20 to repeat the operation and the determination of S20 to S22. If the period T3 is smaller than the predetermined value T stored in ROM 36 (S22: YES), the processing goes to S23 to display the trailing edge of the adhesive sheet S1 on the display unit 41 (S24), thereby completing the processing.

Here, the grounds for the determination in S22 is as follows. That is, the roll diameter of the adhesive sheet S1 which is rolled into the sheet roll 21 is reduced as the use amount thereof is increased. Accordingly, in the case where an adhesive sheet S1 having a fixed length is used, as the roll diameter is reduced, the rotational speed of the sheet roll 21 is increased. This means that the rotational speed of the encoder plate 21a is increased. When the slit pattern is detected by the photointerruptor 32 in the above state, the pulse width T1 of the HIGH signal 50 and the pulse width T2 of the LOW signal 51, that is, the period T3 of the detection signal is reduced. Accordingly, at the time point when the period T3 is smaller than the predetermined value T, the roll diameter of the adhesive sheet S1 in the sheet roll 21 is reduced, whereby the arrival of the trailing edge of the adhesive sheet S1 can be detected.

As described above, according to the lamination apparatus and the adhesive sheet roll 21 of this embodiment, the encoder plate 21a is secured to the end face of the adhesive sheet roll 21, and the slit pattern of the encoder plate 21a is detected by the photointerruptor 32. In addition, the duty ratio T1/T2 is calculated on the basis of the rectangular pulse signals output from the photointerruptor 32, whereby the type and the presence or absence of the adhesive sheet roll 21 can be detected. Even when FEED is carried out on the driving motor at a predetermined number of times, it is determined that no adhesive sheet roll 21 exists if no HIGH signal 50 is input (S6: YES) subsequently to LOW signal 51 (S6: YES), and thus the presence or absence of the adhesive sheet roll 21 can be detected. Further, the period T3 of the rectangular pulse signals output from the photointerruptor 32 is compared with a predetermined value, and at the time point when the period T3 is reduced to be less than the predetermined value T, the trailing edge of the adhesive sheet S1 of the adhesive sheet roll 21 can be detected. Accordingly, the characteristics (the type, the trailing edge of the sheet, the presence or absence of the sheet) of the adhesive sheet roll 21 can be known by using only the photointerruptor 32. Therefore, it is unnecessary to individually provide a sensor for each of the characteristics, so that the lamination apparatus can be simplified in construction.

When the encoder 21a shown in FIG. 1 is replaced by the encoder plate 21a shown in FIG. 4, the rectangular pulse signals detected through the photointerruptor 32 are shown in FIG. 10. Here, the relationship between the black pattern 21d and the white pattern 21e of the slit pattern of the encoder plate 21a shown in FIG. 4 is judge inverse to the relationship between the black pattern 21d and the white pattern 21e of the slit pattern of the encoder plate 21a shown in FIG. 1, and thus as compared with the rectangular pulse signals shown in FIG. 9, the rectangular pulse signals shown in FIG. 10 have the relationship obtained by inverting the relationship between the pulse width T1 of the HIGH signal 50 and the pulse width T2 of the LOW signal 51. The period T3 is the same as described above.

Figure 5:
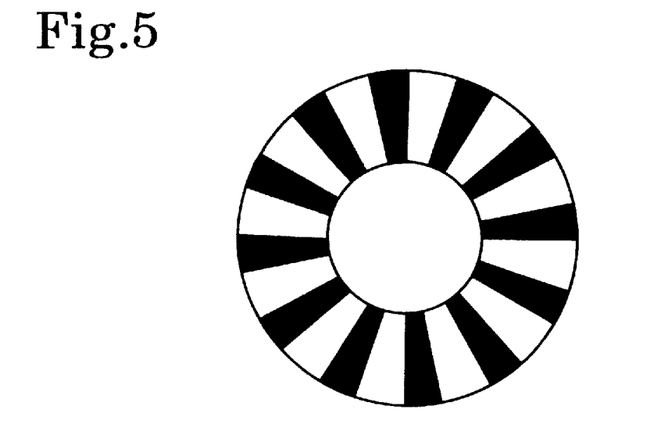
FIG. 5 is a plan view showing another slit pattern on the encoder plate in the first embodiment.
Figure 6:
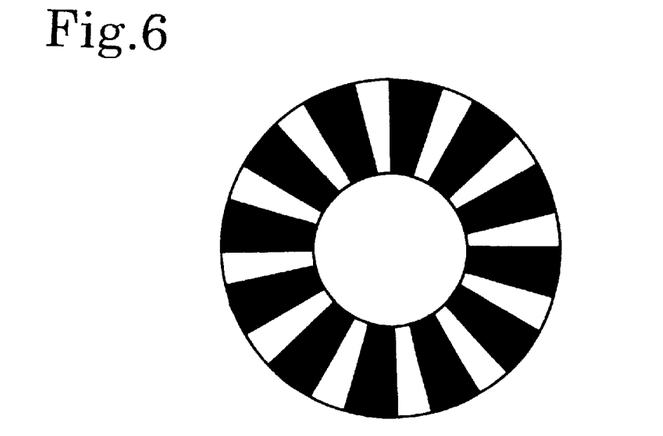
FIG. 6 is a plan view showing another slit pattern on the encoder plate in the first embodiment.

As described above, it is easily understandable that the same relationship as the relationship between FIGS. 9 and 10 can be obtained by the rectangular pulse signals detected by the photointerruptor 32 in the case where the encoder plate 21a shown in FIG. 5 is used and in the case where the encoder plate 21a shown in FIG. 6 is used.

Next, a second embodiment according to the invention will be described with reference to FIGS. 12 and 13. The overall construction of the lamination apparatus and the controller are basically the same as the first embodiment, and the detailed description thereof is omitted from the following description because it is the same as the first embodiment, and in the following description, the particular construction of the second embodiment will be described.

Figure 12:
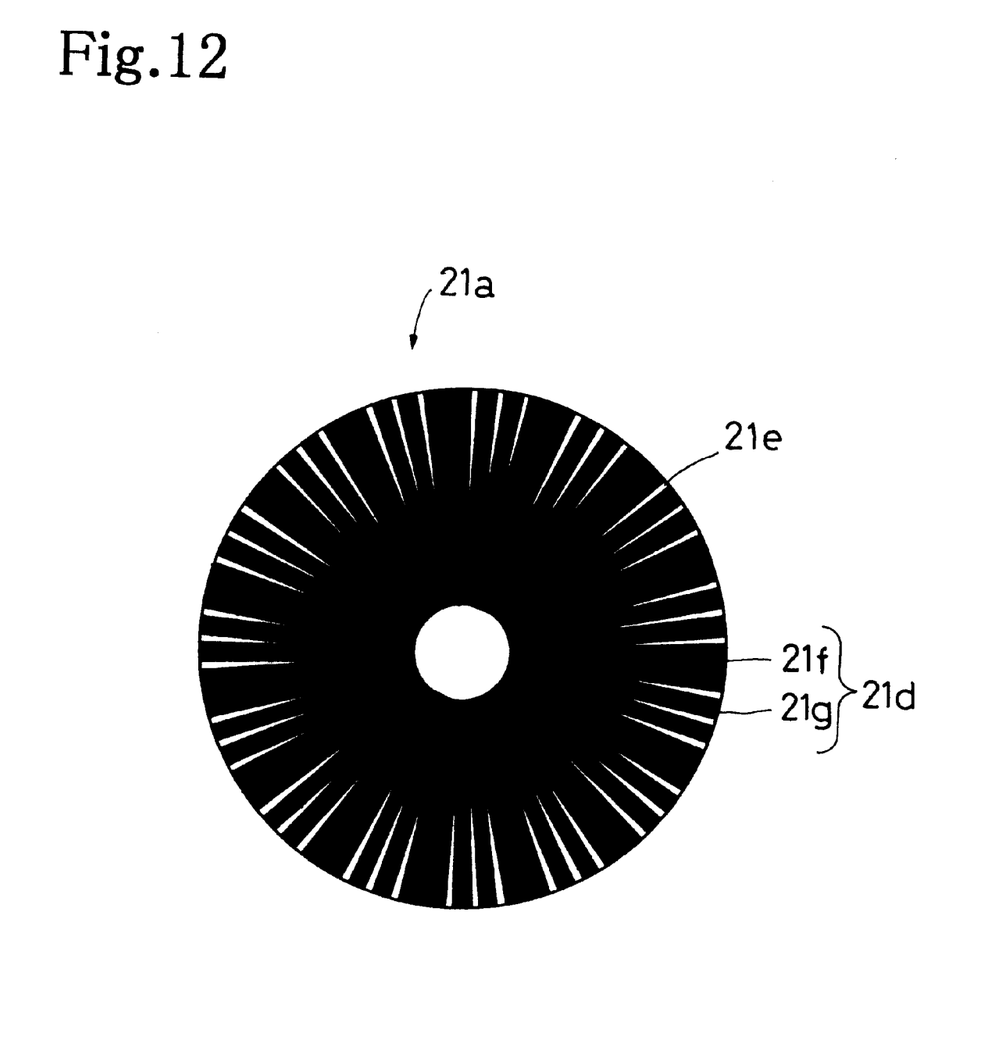
FIG. 12 is a plan view showing a slit pattern on an encoder plate according to a second embodiment of the present invention.

As shown in FIG. 12, a slit pattern of an encoder plate 21a of the second embodiment is composed of a black pattern 21d and a white pattern 21e. The black pattern 21d is composed of wide patterns 21f and narrow patterns 21g, and the number of narrow patterns 21g from a wide pattern 21f to a next wide pattern 21f is set to a fixed value (specifically, three).

Figure 13:
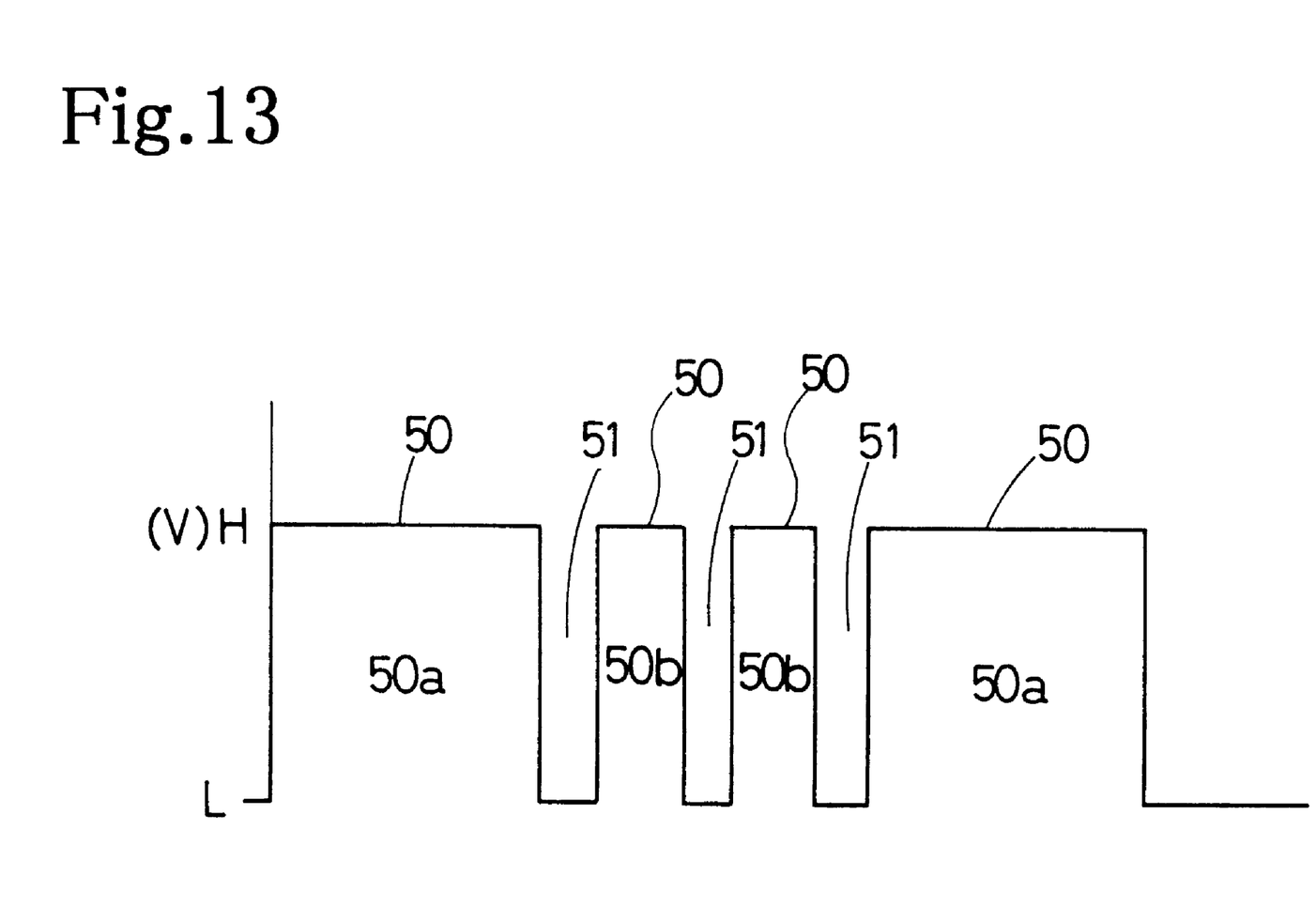
FIG. 13 is a signal waveform diagram showing rectangular pulse signals detected from the slit pattern of the encoder plate of FIG. 12.

FIG. 13 is a signal waveform diagram showing a state where the slit pattern of the encoder plate 21a is detected by the photointerruptor 32. When the black pattern 21d is detected by the photointerruptor 32, a HIGH signal 50 is output. On the other hand, when the white pattern 21e is detected by the photointerruptor 32, a LOW signal 51 is output. Further, in the black pattern 21d, a long HIGH signal 50a is output when the wide pattern 21f is detected by the photointerruptor 32, and a short HIGH signal 50b is output when the narrow pattern 21g is detected by the photointerruptor 32.

Accordingly, when the slit patter of the encoder plate 21a is detected, the presence or absence and the type of the adhesive sheet roll 21 can be identified by detecting the number of LOW signals 51 from a long HIGH signal 50a to a next long HIGH signal 50a because the number of LOW signals 51 from a long HIGH signal 50a to a next long HIGH signal 50a is fixed.

Further, as the adhesive sheet S1 of the adhesive sheet roll 21 being drawn out approaches its trailing edge, the time period from a long HIGH signal 50a to a next long HIGH signal 50a is shortened, and thus by measuring this time period, appearance of the trailing edge of the adhesive sheet S1 can be recognized at the time point when the time period thus measured is shorter than a predetermined value.

As described above, according to the second embodiment, the presence or absence, the type and the trailing edge of the adhesive sheet roll 21 can be also detected by only the photointerruptor 32. Therefore, it is unnecessary to individually provided each sensor for detection of each of the type and the trailing edge. Thus, the construction of the lamination apparatus can be simplified.

The invention is not limited to each of the above first and second embodiments, and various modifications may be made without departing from the subject matter of the invention. For example, in the above embodiments, the invention is applied to the lamination apparatus, however, the invention may be applied to all apparatuses using tape, sheet or the like, such as a tape printing apparatus, etc.

Further, in the above embodiments, the slit pattern of the encoder plate 21a is painted with black and white colors. However, the slit pattern of the encoder plate 21a may be formed with unevenness or it may be formed magnetically. In the latter case, a magnetic sensor is used in place of the photointerruptor 32.

As described above, according to the invention, the encoder member having the slit pattern is secured to the end face of the sheet roll, and the slit pattern is detected at the rotation time of the sheet roll to obtain various information on the sheet roll. On the basis of the various information thus obtained, various characteristics (the presence or absence, the type and the trailing edge portion of the sheet) of the sheet roll can be detected by using only one sensor, thereby achieving a lamination apparatus and a sheet roll which can simplify the construction of the apparatus and reduce the cost.

What is claimed is:

1. A method for operating a lamination apparatus in which both surfaces of an original medium are laminated by a sheet to form a laminated medium, the sheet having an encoder member provided at one end face thereof having a predetermined slit pattern formed thereon, the method comprising:

feeding the sheet using a driver;

detecting the slit pattern of the encoder member and outputting a detection signal; and identifying two or more characteristics of the sheet based on the detection signal.

2. The method as claimed in claim 1, wherein the lamination apparatus using a sheet roll which is obtained by rolling an elongated-band type sheet, the sheet roll having the encoder member provided at one end face thereof and has the predetermined slit pattern formed thereon, wherein the feeding step includes:

rotating the sheet roll using the driver, wherein the slit pattern of the encoder member is detected and a detection signal is output while the sheet roll is rotated by the driver.

3. The method as claimed in claim 2, wherein the identifying step identifies the type of the sheet roll based on the detection signal.

4. The method as claimed in claim 3, wherein the identifying step identifies the trailing edge of the sheet roll based on the detection signal.

5. The method as claimed in claim 4, wherein the identifying step identifies the presence or absence of the sheet roll based on the detection signal.

6. The method as claimed in claim 2, wherein the identifying step identifies the trailing edge of the sheet roll based on the detection signal.

7. The method as claimed in claim 6, wherein the identifying step identifies the presence or absence of the sheet roll based on the detection signal.

8. The method as claimed in claim 2, wherein the identifying step identifies the presence or absence of the sheet roll based on the detection signal.

9. The method as claimed in claim 8, wherein the identifying step identifies the type of the sheet roll based on the detection signal.

10. A lamination apparatus in which both surfaces of an original medium are laminated by a sheet to form a laminated medium, comprising:

a driver that feeds the sheet;

an encoder member provided at one end face of the sheet having a predetermined slit pattern formed thereon;

a detector that detects the slit pattern of the encoder member and outputs a detection signal; and a controller that identifies two or more characteristics of the sheet based on the detection signal output from the detector.

11. The lamination apparatus as claimed in claim 1, further comprising:

a sheet roll which is obtained by rolling an elongated-band type sheet, the sheet roll having the encoder member provided at one end face thereof having the predetermined slit pattern formed thereon, wherein the driver rotates the sheet roll, and the detector detects the slit pattern of the encoder member and outputs a detection signal while the sheet roll is rotated by the driver.

12. The lamination apparatus as claimed in claim 11, wherein the controller identifies the type of the sheet roll based on the detection signal.

13. The lamination apparatus as claimed in claim 12, wherein the controller identifies the trailing edge of the sheet roll based on the detection signal.

14. The lamination apparatus as claimed in claim 13, wherein the controller identifies the presence or absence of the sheet roll based on the detection signal.

15. The lamination apparatus as claimed in claim 11, wherein the controller identifies the trailing edge of the sheet roll based on the detection signal.

16. The lamination apparatus as claimed in claim 15, wherein the controller identifies the presence or absence of the sheet roll based on the detection signal.

17. The lamination apparatus as claimed in claim 11, wherein the controller identifies the presence or absence of the sheet roll based on the detection signal.

18. The lamination apparatus as claimed in claim 17, wherein the controller identifies the type of the sheet roll based on the detection signal.

19. A sheet roll unit for use in a laminating apparatus having a detector and a controller to laminate both surfaces of an original medium using a sheet to form a laminated medium, comprising:

a sheet roll having an elongated band type sheet rolled in a roll shape; and an encoder member having a predetermined slit pattern formed therein secured to the end face of the sheet roll.

20. The sheet roll unit as claimed in claim 19, wherein the detector detects the slit pattern of the encoder member and outputs a detection signal while the sheet roll is rotated, and the controller identifies two or more characteristics of the sheet roll based on the detection signal output from the detector.

21. The sheet roll unit as claimed in claim 20, wherein the controller identifies the type of the sheet roll based on the detection signal.

22. The sheet roll as unit claimed in claim 21, wherein the controller identifies the trailing edge of the sheet roll based on the detection signal.

23. The sheet roll unit as claimed in claim 22, wherein the controller identifies the presence or absence of the sheet roll based on the detection signal.

* * * * *